United States Patent [19]

Guipaud

[11] 4,279,143

[45] Jul. 21, 1981

[54] ELECTRONIC PINKING DETECTOR

[75] Inventor: Serge C. Guipaud, Castelnaudary, France

[73] Assignee: Societe Pour l'Equipement de Vehicules, Issy-les-Moulineuax, France

[21] Appl. No.: 107,051

[22] Filed: Dec. 26, 1979

[30] Foreign Application Priority Data

Feb. 23, 1979 [FR] France ............................ 79 04707

[51] Int. Cl.³ ..................... G01L 23/22; F02P 5/14
[52] U.S. Cl. .................................. 73/35; 123/425
[58] Field of Search ............ 73/35; 123/415–417, 123/425

[56] References Cited

U.S. PATENT DOCUMENTS 3,950,981  4/1976  Arrigoni et al. .................. 73/35
4,002,155  1/1977  Harned et al. ................... 123/425

Primary Examiner—James J. Gill
Attorney, Agent, or Firm—Brisebois & Kruger

[57] ABSTRACT

An electronic device for detecting and correcting pinking in an internal combustion engine by changing the ignition displacement of the internal combustion engine which comprises a vibration pick-up mounted on the internal combustion engine providing a signal to a band-pass filter for selecting a frequency band corresponding to pinking vibrations and a comparator, the output of which provides a signal for altering the ignition displacement of the engine and the two inputs which receive the output from the band-pass filter after it has undergone different treatments in two parallel channels, one channel comprising an integrator followed by an amplifier and the second channel preferably comprising an integrator, therebeing provided a gate between the band-pass filter and the two channels, which gate is only open for a predetermined angular zone during operation of the internal combustion engine.

12 Claims, 4 Drawing Figures

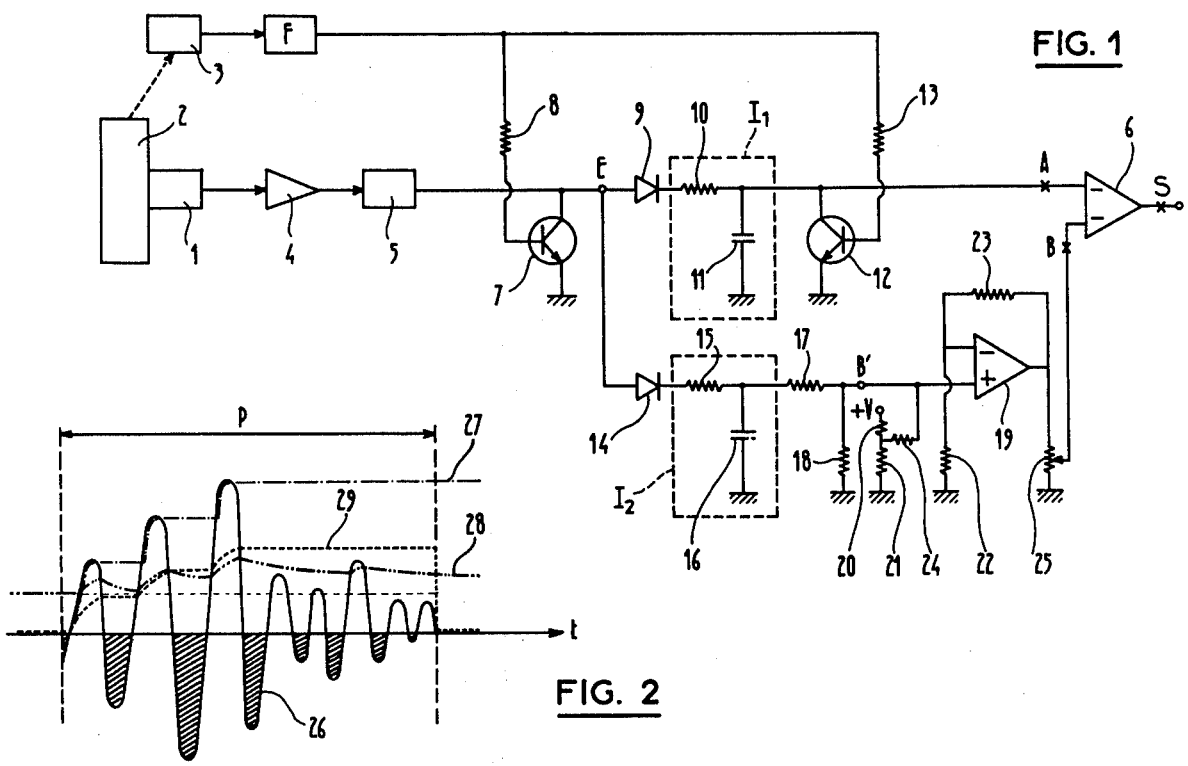

ELECTRONIC PINKING DETECTOR

The present invention relates to an electronic device intended to be used in combination with means which start off ignition in the cylinders of an internal combustion engine. It is known that, for the purpose of ensuring that an internal combustion engine functions satisfactorily, use has to be made of an ignition device, the rotating spindle of which is driven by the engine, this ignition device providing an initial signal which triggers off the discharge from an ignition coil to the sparking-plug coil of the engine, which latter coil requires to be supplied with a high-voltage current. The emitted ignition signal is displaced relatively to the arrival at top dead centre of the cylinder which is under compression and wherein ignition is to be caused. The displacement of the ignition signal is a function of the speed of rotation.

On the other hand, it is known that under certain conditions the operation of an internal combustion engine causes the phenomenon of "pinking" to occur, and this is followed by vibrations at the cylinder head and excessive heating of the engine which, in certain operating conditions, can bring about deterioration of certain parts of the engine. Based on the ignition-advance curve, which provides a maximum couple for a given system, if efforts are made to improve the performance of the engine by increasing the volumetric relationship or by using a supercharging means, there arises the risk of the occurrence of the pinking phenomenon. The possibility has therefore been considered of monitoring the occurrence of pinking so as to reduce, at this moment only, the extent of ignition advance. To do this, use is made of a vibration pick-up, which is located on the engine block and monitors the occurrence of pinking that corresponds to vibrations having frequencies of between 5 and 10 KHz. The vibration pick-up, which is used to detect the occurrence of the pinking phenomenon, is an "accelerometer" of the conventional type, which is generally directly attached to the internal combustion engine; this pick-up registers not only the vibrations resulting from actual pinking, but also all the vibrations caused by the operation of the internal combustion engine, so that the pick-up continually receives vibrations causing basic noise and, when pinking occurs, specific vibrations corresponding to the pinking. Consequently, to monitor the occurrence of pinking, it is necessary, when considering the recording of the pick-up, to distinguish between basic noise on the one hand, and vibrations due to pinking, on the other. Since the occurrence of certain vibration phenomena, pinking in particular, results in an increase in the amplitude of the electrical signal provided by the accelerometer, a simple method consists in comparing the signal provided by the accelerometer with a predetermined threshold. However, the amplitude of the signal varies with the speed of the internal combustion engine.

In U.S. Pat. No. 4,012,942 it has been proposed, for the purpose of detecting pinking vibrations, to compare the signal provided by the pick-up with a signal corresponding to the basic noise and programmed as a function of the speed of rotation of the engine. The disadvantage of such means stems from the fact that the basic noise is essentially a function of the internal combustion engine producing it, so that to effect suitable monitoring of the pinking vibrations, it would be necessary to have a different basic noise programmed according to the type of engine with which the device is intended to co-operate, and this represents a very considerable drawback since one and the same device cannot be used for all existing engines. Furthermore, in the case of one and the same engine, the basic noise varies with the age of the engine, so that a device of this type, even if capable of providing a suitable result for a new engine for which it had been designed, would not give such a result when the engine had become worn after a certain period of use.

It has also been proposed—French Pat. No. 2,244,981—to measure the basic noise of an engine during a period in which it is known that pinking does not occur, to feed a signal corresponding to this basic noise into a memory, and then to compare this memorized signal with the signal furnished by the pick-up so as to detect any pinking that may occur. Compared with the apparatus of U.S. Pat. No. 4,012,942, this equipment offers the advantage that it can be used in the same conditions whatever the type and age of the engine with which it is used. However, this apparatus suffers from a considerable disadvantage because of the fact that the recording of the basic noise takes place at a moment in operations that is different from that at which pinking occurs. It is in fact known that the phenomenon of pinking occurs during the operational cycle of a cylinder only during the commencement of the driving time and, more precisely, in a zone of between 0° and 70° following top dead centre (monitoring of the rotation of the crankshaft), the complete driving time of a cylinder corresponding to 180° beyond top dead centre. The apparatus described in French Pat. No. 2,244,981 is intended to monitor the basic noise in a zone outside the zone selected for detecting pinking; however, the basic noise occurring during the running of an internal combustion engine is not constant during the operating cycle since it includes vibrations produced by the movements or impacts of a certain number of metallic components such as the valves, for example. Consequently, the basic noise that is compared with the signal furnished by the pick-up is different from that occurring in the angular zone in which pinking is likely to occur, so that such apparatus is not entirely satisfactory.

To avoid this inconvenience, it has also been proposed—in U.S. Pat. No. 3,822,583—to filter the signal provided by the pick-up so as to obtain a band-pass corresponding to the frequencies emitted when pinking occurs and continually to compare this filtered signal with the output from an integrator to which said filtered signal is fed. Said integrator provides a signal, the level of which is a function of the basic noise that occurs, but since the comparison between the filtered signal and the integrated filtered signal takes place on a continual basis, there exists a considerable risk that the comparator will detect a vibration, the level of which exceeds the mean level indicated by the integrated filtered signal at a moment during the operational cycle that is simply not the moment at which pinking occurs; this detection may take place, for example, at the moment when a valve closes, and it can then influence the angular ignition displacement although no pinking phenomenon has occurred during the functioning of the internal combustion engine. It will thus be seen that this apparatus is not satisfactory either.

The present invention aims at providing an electronic device which in a simple, economical and reliable manner permits the monitoring of the occurrence of the pinking phenomena during the operation of an internal combustion engine. According to the invention, use is made of the signal provided by a vibration pick-up, after filtering, for the purpose of retaining only the frequencies corresponding to the frequency band of the pinking vibrations, and this filtered signal is compared with a signal which is a function of the mean value of the filtered signal, this comparison taking place only in the angular zone of the operating cycle wherein pinking is likely to occur. This mode of operation makes it possible to avoid acting on the ignition when a large vibration is recorded by the pick-up and is produced by any phenomenon other than pinking at a moment in the operating cycle at which pinking cannot occur. Thus, the technique disclosed in U.S. Pat. No. 3,822,583 is considerably improved by rendering the pinking-monitoring device reliable. Furthermore, according to a further feature of the invention, reliability in monitoring is further increased by effecting a comparison, not between a mean value, produced by an integrator, and the signal from the pick-up, but between, on the one hand, a mean value, the level of which takes into account the mean values in corresponding previous angular zones, and, on the other hand, an integrated value, the level of which takes into account only vibrations recorded by the pick-up in the angular zone under consideration. This mode of operation makes it possible to prevent an abnormally great momentary vibration, produced in a small fraction of the angular zone considered but not corresponding to the pinking phenomenon, from initiating an action affecting the ignition displacement of the internal combustion engine. It will thus be seen that the reliability of the device is increased.

Thus, the present invention is concerned with a new industrial product which consists of an electronic device for detecting pinking and capable of providing a signal S for altering the ignition displacement of an internal combustion engine, which device comprises, firstly, a vibration pick-up secured to the internal combustion engine and supplying a band-pass filter which selects the frequency band corresponding to the pinking vibrations and, secondly, a comparator, the output of which provides the signal S, and the two inputs A and B of which receive the output from the band-pass filter following different treatments carried out along two parallel channels, the channel which corresponds to the input B comprising an integrator $I_2$ followed by an amplifier, characterized in that, between the band-pass filter and the two channels, a gate is interposed which is opened only in a predetermined angular zone in the operation of the internal combustion engine.

In a preferred embodiment, the angular zone in the operation of the internal combustion engine wherein the gate of the device is open is between 0° and 70° and preferably approximately 30° beyond the top dead centre for the operation of each cylinder, the angular monitoring being carried out on the rotation of the crankshaft by means of a circuit F, and the opening of the gate is triggered by the electronic circuit F which receives a signal from the ignition pick-up associated with the internal combustion engine, this circuit providing a periodical signal, the beginning and end of which are, in each period, in a substantially constant position in relation to the moment of reaching top dead centre, a predetermined margin of error being allowed, said circuit comprising on the one hand, at least one stage which generates a signal displaced by a time constant in relation to the signal it receives and, on the other hand, at least one stage which generates a signal displaced from the signal that is received, by a time corresponding to a constant angle of rotation of the engine, these two types of stage being arranged in series to define the start and/or the end of the resultant signal (the details of such circuit are provided in the U.S. patent application Ser. No. 94,674 filed on Nov. 15th, 1979, here incorporated by reference) and the gate arranged at the output of the band-pass filter is constituted by a transistor, the base of which is controlled by the circuit F, and the two other terminals of which are connected, one to earth and the other to the two channels terminating at the two inputs of the comparator, each of these two channels comprising a diode.

In a particularly advantageous embodiment, the processing of the signal between the band-pass filter and the input A of the comparator consists in integration by passage through an integrating circuit $I_1$, the charge time constant of which is much lower (for example ten times lower) than the charge time constant of the integrator $I_2$ arranged upstream of the input B of the comparator, the output of the integrator $I_1$ being reset to zero at the end of each angular zone in which feeding of the two integrator circuits $I_1$ and $I_2$ takes place; the resetting to zero of the voltage at the input A of the comparator is achieved by a transistor, the base of which is controlled by the output of the circuit F; the integrator circuits $I_1$ and $I_2$ are constituted by a resistor, connected in series along the supply line of said integrator circuit, and a capacitor arranged between the output of said resistor and earth; a resistor is connected in parallel between the output of the integrator $I_2$ and earth in such manner that the integrator circuit $I_2$, connected to said resistor, has a discharge time constant which is very much greater than its charge time constant; the discharge time constant of the integrator $I_2$, connected to the discharge resistor, is sufficiently low for the output voltage from $I_2$ to follow, as a function of the changes in the rate of rotation of the engine, the maximum variations in the mean level of the voltage emitted by the vibration pick-up; the amplifier which receives the voltage provided by the integrator $I_2$ supplies, to the input B of the comparator, a voltage which is a linear function of the voltage provided by the integrator $I_2$.

As previously indicated, the use of the comparator of the device in accordance with the invention, solely in an angular zone P where pinking is likely to occur, makes it possible to avoid unintentional action on the ignition displacement due to a phenomenon totally different from pinking and occurring in a part of the cycle where it is certain that pinking cannot occur. Furthermore, the input A of the comparator receives the voltage which, because of the low time constant of the integrator $I_1$, is an image of the area defined by the curve that represents the signal emitted by the vibration pick-up in an angular zone P where pinking can occur; however, this area is itself an image of the vibration energy so that the voltage at the input A of the comparator is an image of the vibration energy in the angular zone P under consideration. This voltage, having been brought back to zero at the end of each angular zone P, corresponds only to the vibratory behaviour of the angular zone P under consideration, irrespective of what has happened in the preceding angular zones P. On the other hand, the voltage provided by the integrator $I_2$, because of the high discharge time constant of this integrator, is an image of the mean value of the vibration energy, taking into account vibratory phenomena occurring in the preceding angular zones, so that this signal represents an image of the mean noise. Processing of the signal, provided by the integrator $I_2$, by means of an operational amplifier makes it possible to obtain at the terminal B of the comparator a value which is a linear function of this image of the average noise, since it can be considered that pinking occurs when the vibration energy is above the value obtained by applying a multiplier coefficient of safety to the average noise.

It will thus be seen that the comparator of the device in accordance with the invention receives at its two inputs measured quantities corresponding to phenomena which occur in the same part of the operating cycle of the engine, the basic noise being monitored as a mean value in the same angular zone P as the image of the vibration energy, which makes it possible to detect the occurrence of pinking. Thus, by means of this device, it has become possible to eliminate all the disadvantages of the above-mentioned prior-art devices.

To enable the subject-matter of the invention to be better understood, an embodiment illustrated in the attached drawings will now be described simply by way of illustration and nonlimiting example.

In these drawings:

FIG. 1 shows the block diagram of an electronic device in accordance with the invention;

FIG. 2 illustrates, for purposes of explanation, a graph comparing signals obtained at the output of an integrator circuit over an angular zone P and dependent upon the time constant value of this circuit;

Figure 3:
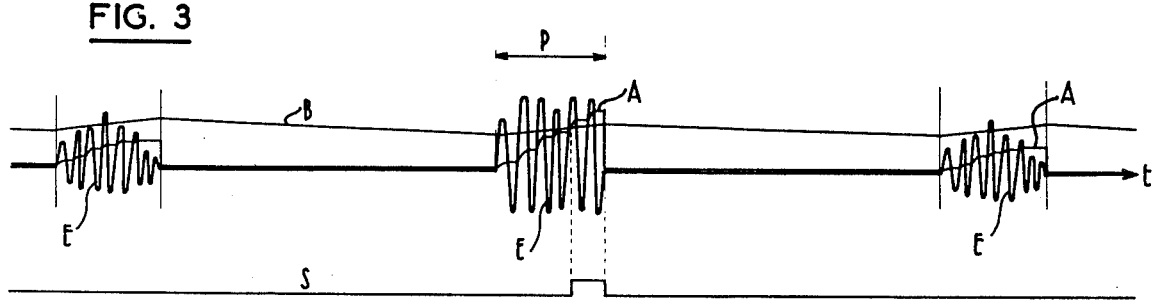
FIG. 3 shows the change, with time, of the voltages at the inputs A and B of the comparator assuming a constant running of the engine, the signal S being the output signal from the comparator; and, FIG. 4 illustrates, on a smaller time scale, the curves giving the voltages at points A, B and B' in the circuit of FIG. 1, as well as the signal S for when the engine runs at an accelerated rate.

Referring to FIG. 1, it will be seen that the device in accordance with the invention comprises a vibration pick-up or accelerometer 1. The pick-up 1 is mounted on the internal combustion engine 2 of a motor vehicle, the rotary position of the crankshaft of the engine in relation to top dead centre being monitored by a position pick-up 3. The signal provided by the accelerometer 1 is passed to an amplifier 4 and then to a band-pass filter 5 which selects the frequencies between 5 and 10 KHz. It is in fact known that when the phenomenon of pinking occurs during the running of an internal combustion engine, the corresponding vibrations have frequencies which are between 5 and 10 KHz. On the other hand it is known that the phenomenon of pinking occurs only at the start of the driving time in the cycle of a cylinder, and it has been found that it is possible to monitor the occurrence of pinking by analyzing the data provided by the accelerometer 1 only in an angular zone P extending from 0° to 30° following top dead centre in the cycle of a cylinder, this monitored angular value being expressed in degrees of rotation of the crankshaft. At its output, a circuit F provides a signal throughout the angular zone where it is desired to analyze the data from the accelerometer 1 after passage through the filter 5. In the U.S. Patent Application Ser. No. 94,674, filed on Nov. 15th, 1979 (incorporated by reference), there is described a simple form of construction of the unit constituted by the position pick-up 3 and the circuit 4, and this construction makes it possible to use the ignition signal as the pick-up signal, provided that a margin of error is acceptable in determining the angular zone.

The output from the filter 5 is passed at point E in the block diagram to the two channels leading to the two inputs A and B of the comparator 6. Between the filter 5 and the point E is interposed a gate constituted by a transistor 7, the base of which is connected through a resistor 8 to the output of the circuit F. Over the angular range defined by the circuit F, the transistor 7 is blocked whereas outside this range it is open, and this causes the point E to be earthed and therefore completely prevents the comparator 6 from operating.

Between the point E and the input A of the comparator 6, the channel comprises a diode 9 followed by an integrator circuit $I_1$ which is constituted by a resistor 10 connected in series with the diode 9, and a capacitor 11 connected in parallel between the output of the resistor 10 and earth. The output of the integrator $I_1$ is connected to the collector of a transistor 12, the emitter of which is earthed, while its base is supplied, by way of a resistor 13, with the output signal from the circuit F. The transistor 12 is blocked during the entire time of the signal emitted by the circuit F, and it is open when this signal is suppressed, so that at the end of the 0°-30° angular zone, the signal provided by the circuit $I_1$ is reset to zero. The output of the circuit $I_1$ is connected to the input A of the comparator 6.

The channel extending from the point E to the input B of the comparator 6 comprises a diode 14 followed by an integrator circuit $I_2$ which comprises a resistor 15 in series with the diode 14, and a capacitor 16 in parallel between earth and the output of the resistor 15. The output of the integrator circuit $I_2$ is connected in series with a resistor 17, the output of which is designated by the letter B'. Between B' and earth is connected a resistor 18. The charge time constant of the integrator circuit $I_2$ is determined by the resistor 15 and the capacitor 16; the discharge time constant of the integrator circuit $I_2$ is determined by the capacitor 16 and the resistors 17 and 18. The point B' is connected to the positive input of an operating amplifier 19; this positive input is brought to a certain voltage by means of a dividing bridge constituted by two resistors 20 and 21, one of the ends of the dividing bridge receiving the supply voltage $+V$, and the other being connected to earth; the median point between the resistors 20 and 21 is connected through a resistor 24 to the positive terminal of the amplifier 19. The negative terminal of the amplifier 19 is brought to a certain voltage by connecting it to earth through the resistor 22 and it is also connected by the resistor 23 to the output of the operating amplifier. The output of the amplifier 19 is connected to earth by a resistor 25, from which part of the output voltage is picked up and passed to the input B of the comparator 6. This method of connecting the amplifier 19 enables a voltage to be obtained at B that is a linear function of the voltage delivered by the integrator $I_2$.

The time constant of the integrator $I_1$ depends upon the resistor 10 and the capacitor 11. In this example it is taken as being 100 microseconds; this time constant corresponds to the charge since discharge takes place instantaneously when the transistor 12 is open. The charge time constant of the integrator $I_2$ in this example is only 1 millisecond. If it is assumed that the change in the maximum speed of the engine 2 is from 1000 r.p.m. to 6000 r.p.m. per second, then in these conditions, a discharge time constant of 100 milliseconds will be used for the integrator $I_2$.

FIG. 2 provides a comparison of the signals obtained by different types of circuit consisting of a resistor in series and of a capacitor in parallel and receiving at their inputs the signals provided by the filter 5. What happens within an angular zone of 0°–30° designated by P in FIG. 2, will now be examined as to its essentials. The signal coming from the filter 5 has been designated by the numeral 26 in FIG. 2. If it is assumed that the circuit concerned is acted upon by way of a diode, it is not necessary to take into account the negative part of the signals 26, this corresponding to the shaded portion in FIG. 2. The curve 27 corresponds to a circuit having a zero time constant, that is to say a circuit constituted only by a capacitor. It will be seen that the circuit then behaves as a peak detector, and that this circuit does not discharge after having been charged. The curve 28 corresponds to an integrator circuit having a high charge time constant and a still higher discharge time constant, this being the case with the circuit $I_2$. It will be seen that the output voltage drops only very slowly from one zone P to another zone P and that, in a zone P, this voltage is successively increased and reduced, the increases being more rapid than the reductions so that at the end of the zone P, the voltage is higher than at the inputs; if successive zones P are substantially identical, it will then be seen that, apart from slight oscillation, the signal 28 remains at a substantially constant value which increases slightly in a zone P, and decreases slightly between two zones P. The curve 29 represents an intermediate case constituted by the circuit $I_1$. In fact, this circuit has a quite low charge time constant, so the voltage at the output of the circuit $I_1$ increases quite rapidly and, since there is no possibility of discharge in the zone P, this voltage only increases, as in a peak detector of the same type as that which corresponded to the curve 27. The curve 29 resumes a zero value at the end of the zone P because of the presence of the transistor 12.

It will thus be seen that the voltage at the input A of the comparator 6 provides some sort of image of the vibration energy in the zone P, whereas the voltage at B', at the output from the integrator $I_2$, is an image of the mean value of the amounts of vibration energy in the zones P preceding the zone P under consideration. Consequently, the voltage at A is an image of the vibrational behaviour of the engine in the zone P under consideration, whereas the voltage at B' is an image of the basic noise of the engine in the zone P. If pinking occurs, the level of vibration in the zone P will be considerably greater than the level of vibration of the basic noise. To take into account the fact that ignition displacement of the engine 2 should be altered only if it is certain that pinking is occurring when the engine is running, it is necessary to apply a proportionality coefficient to the voltage at B', and this coefficient is provided by the amplifier 19. As already indicated, the voltage at B is a linear function of the voltage at B'.

FIG. 3 shows the signals A and B for when the engine 2 is running at constant load. When pinking does not occur in the zone P, the signal A always remains lower than the signal B, whereas on the other hand the voltage at A becomes greater than the signal B within a zone P when pinking occurs (which is the case as regards the zone P at the middle of FIG. 3). In this case, a signal S, which is indicated on the second line of FIG. 3, occurs at the output C of the comparator 6. This signal S is used for triggering ignition retardation having an angle great enough to ensure than the pinking phenomenon is suppressed.

Figure 4:
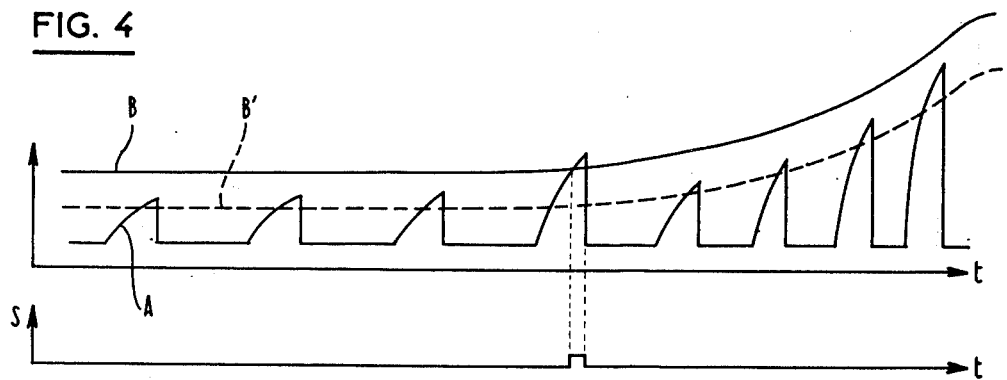

FIG. 4 illustrates the variation in the voltages A, B' and B when the engine is not under constant load, but is accelerated. In view of the scale used for this representation, it was hardly possible to show the undulations in the voltages B' and B, so that these voltages appear to be regular mean values and not in the form of undulations. In each zone wherein pinking is likely to occur, the signal A appears, in the same way, as an evenly increasing signal without the undulations in the increase being visible in the representation in view of its scale. When the voltage at A rises above the voltage at B, it is safe to say that pinking has been detected, in view of the margin of safety existing between B' and B. At this moment, the comparator 6 emits a gating signal S at its output C.

It will of course be understood that the embodiment described above is in no way limiting and that it could be modified in any desirable way without thereby departing from the framework of the present invention.

What is claimed is:

1. An electronic device for detecting pinking and capable of providing a signal S for altering the ignition displacement of an internal combustion engine, which device comprises, firstly, a vibration pick-up secured to the internal combustion engine for supplying a band-pass filter for selecting the frequency band corresponding to the pinking vibrations and, secondly, a comparator, the output of which provides signal S, and the two inputs A and B of which receive the output from the band-pass filter following different treatments carried out along two parallel channels, the channel which corresponds to the input B comprising an integrator $I_2$ followed by an amplifier, wherein, between the band-pass filter and the two channels, a gate is interposed which is opened only in a predetermined angular zone in the operation of the internal combustion engine.

2. A device according to claim 1, wherein the angular zone in the operation of the internal combustion engine in which the gate of the device is open, is between 0° and 70° beyond top dead centre for the operation of each cylinder, angular monitoring being carried out on the rotation of the crankshaft by means of a circuit F.

3. A device according to claim 1, wherein the angular zone in the operation of the internal combustion engine in which the gate of the device is open, is between 0° and 30° beyond top dead centre for the operation of each cylinder, angular monitoring being carried out on the rotation of the crankshaft by means of a circuit F.

4. A device according to claim 1 which also includes triggering means for opening of the gate said means comprising an electronic circuit F which receives a signal from an ignition pick-up associated with the internal combustion engine, the circuit providing a periodical signal, the beginning and end of which are, in each period, in a substantially constant position in relation to the moment of reaching top dead centre, a predetermined margin of error being allowed, said circuit comprising, on the one hand, at least one stage for generating a signal displaced by a time constant in relation to the signal it receives and, on the other hand, at least one stage for generating a signal displaced from the signal that it receives, by a time corresponding to a constant angle of rotation of the engine, these two types of stage being arranged in series to define the start and/or the end of the resultant signal.

5. A device according to claim 1, wherein the gate, provided at the output of the band-pass filter, is constituted by a transistor, the base of which is controlled by the circuit F, and the two other terminals of which are connected, one to earth and the other via rectifier elements to the two channels terminating at the two inputs A and B of the comparator.

6. A device according to claim 1, wherein means are provided for processing the signal between the band-pass filter and the input A of the comparator by integration said means comprising integrator circuit $I_1$, the charge time constant of which is much lower than the charge time constant of the integrator $I_2$ arranged upstream of the input B of the comparator, means being provided by which the input of the integrator $I_1$ is reset to zero at the end of each angular zone in which feeding of the two integrator circuits $I_1$ and $I_2$ takes place.

7. A device according to claim 6, wherein the means for resetting to zero of the voltage of the input of the integrator $I_1$ comprises a transistor, the base of which is controlled by the output of the circuit F.

8. A device according to claim 6, wherein the integrator circuits $I_1$ and $I_2$ are formed by a resistor connected in series with the supply for said integrator circuits, and a capacitor provided between the output of said resistor and earth.

9. A device according to claim 1, wherein the integrator circuit $I_2$ has a discharge time constant which is much greater than its charge time constant.

10. A device according to claim 9, wherein discharge means for the integrator $I_2$ comprises a resistor of very high rating connected in parallel between the output of the integrator $I_2$ and earth.

11. A device according to claim 10, wherein the integrator circuit $I_2$ is so arranged that the discharge time constant of the integrator $I_2$, connected to the discharge resistor, is sufficiently low to enable the output voltage of $I_2$ to follow, as a function in the changes in the load of the engine, the maximum variations in the mean level of the voltage released by the vibration pick-up.

12. A device according to claim 1, wherein the amplifier which receives the voltage provided by the integrator $I_2$ is arranged to deliver, to the input B of the comparator, a voltage which is a linear function of the voltage provided by the integrator $I_2$.

* * * * *